D. M. HARTSOUGH.
TRACTOR.
APPLICATION FILED SEPT. 29, 1913.
1,128,246.
Patented Feb. 9, 1915.
5 SHEETS—SHEET 1.
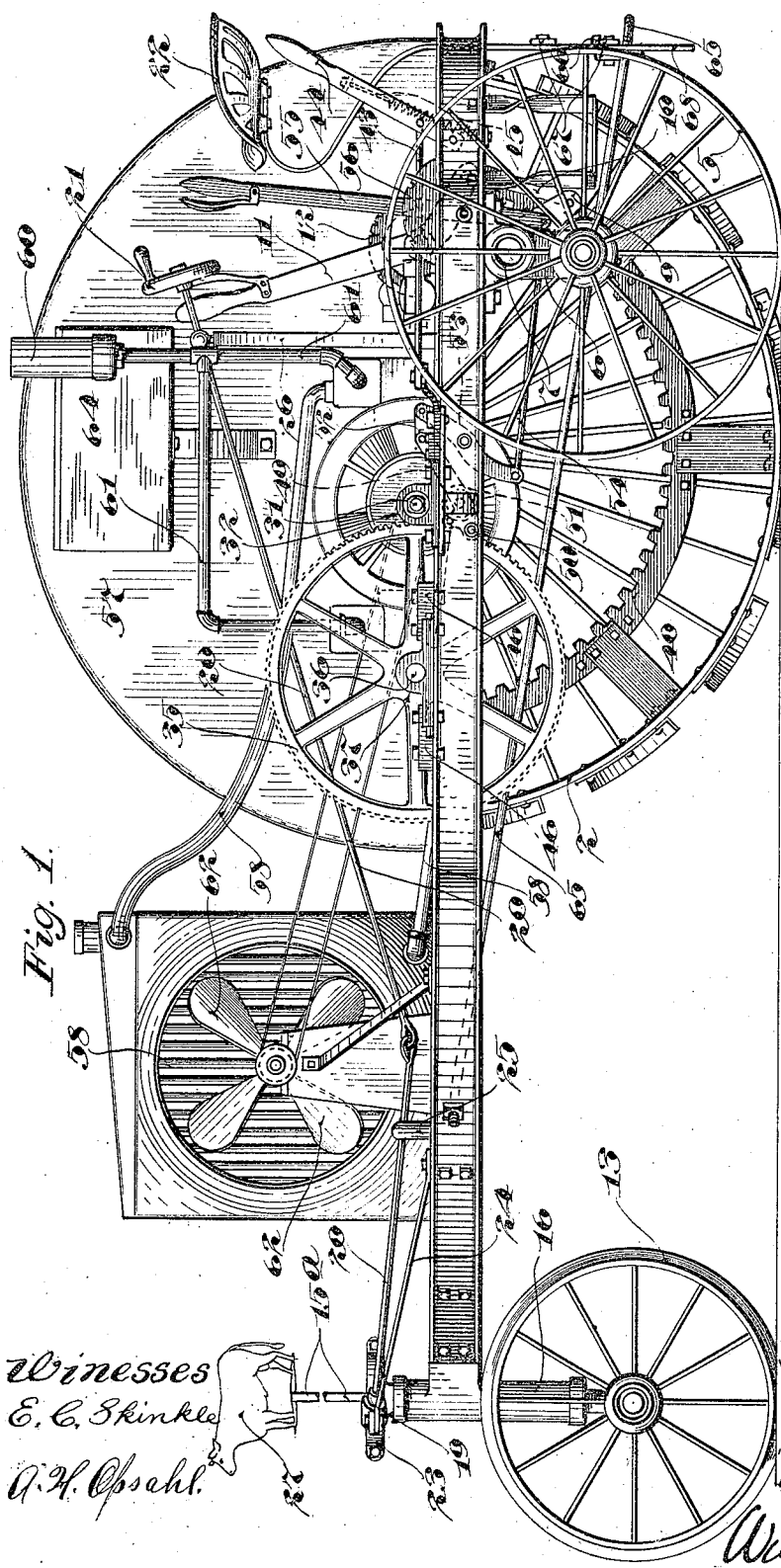

D. M. HARTSOUGH.
TRACTOR.
APPLICATION FILED SEPT. 29, 1913.
1,128,246.
Patented Feb. 9, 1915.
5 SHEETS—SHEET 2.
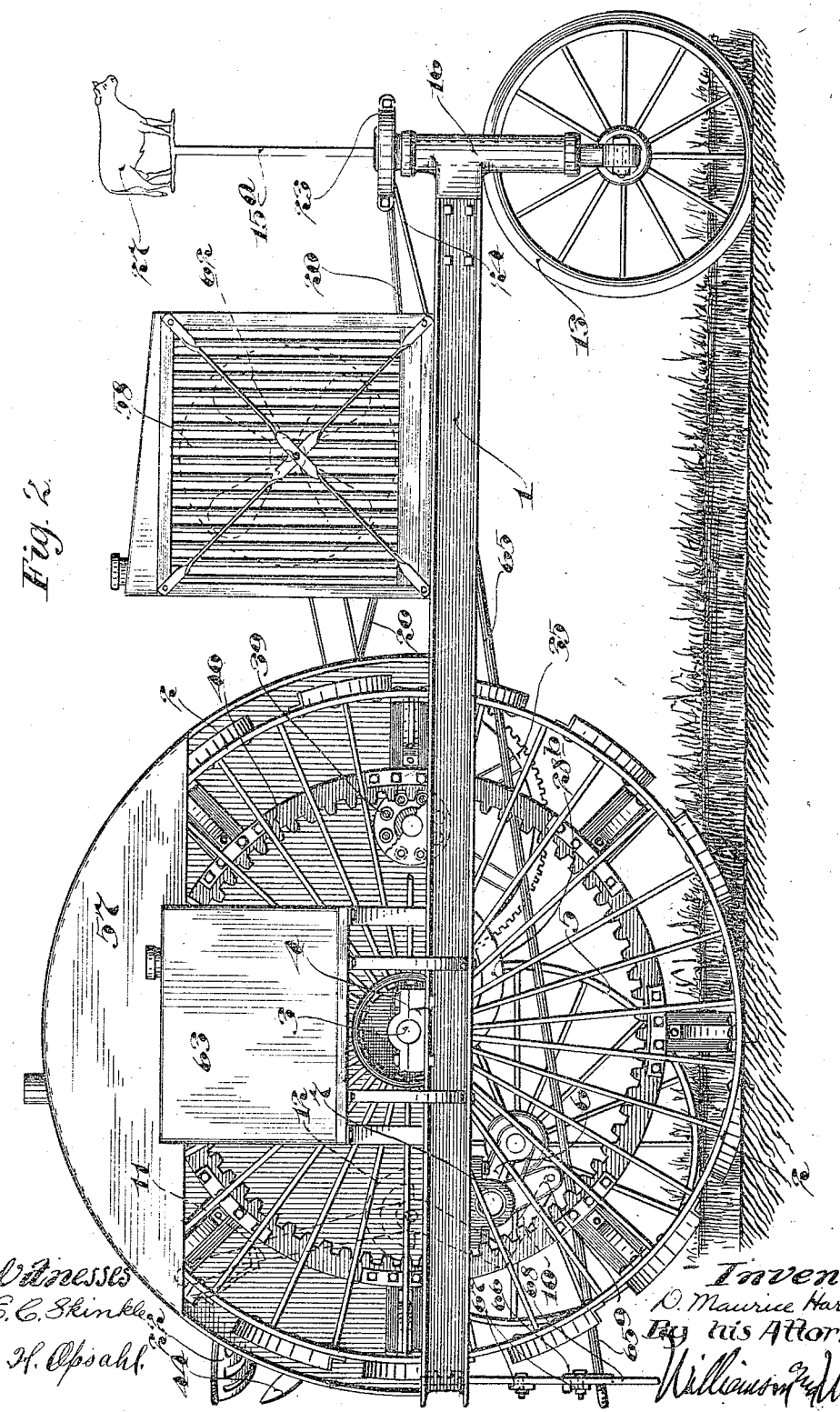

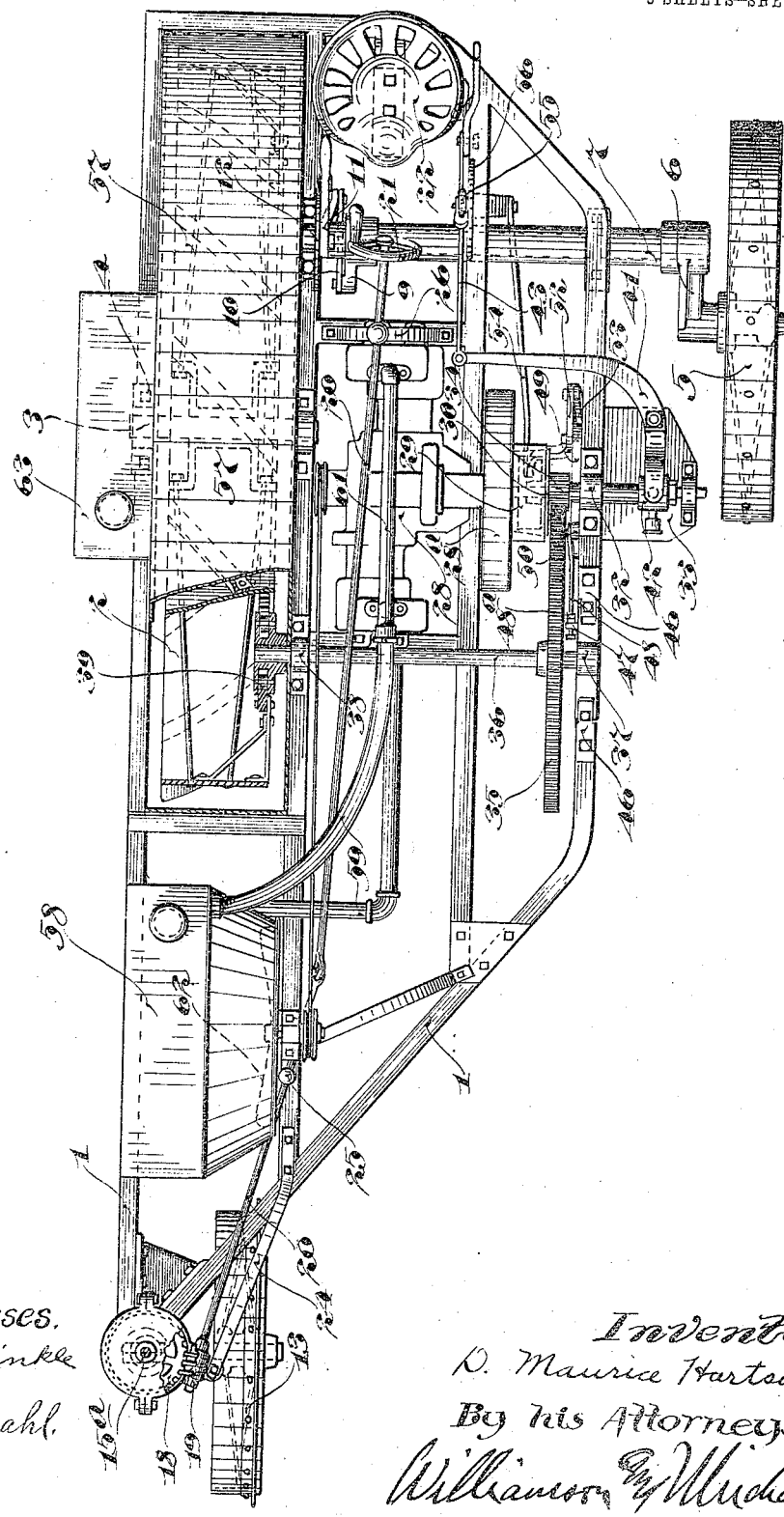

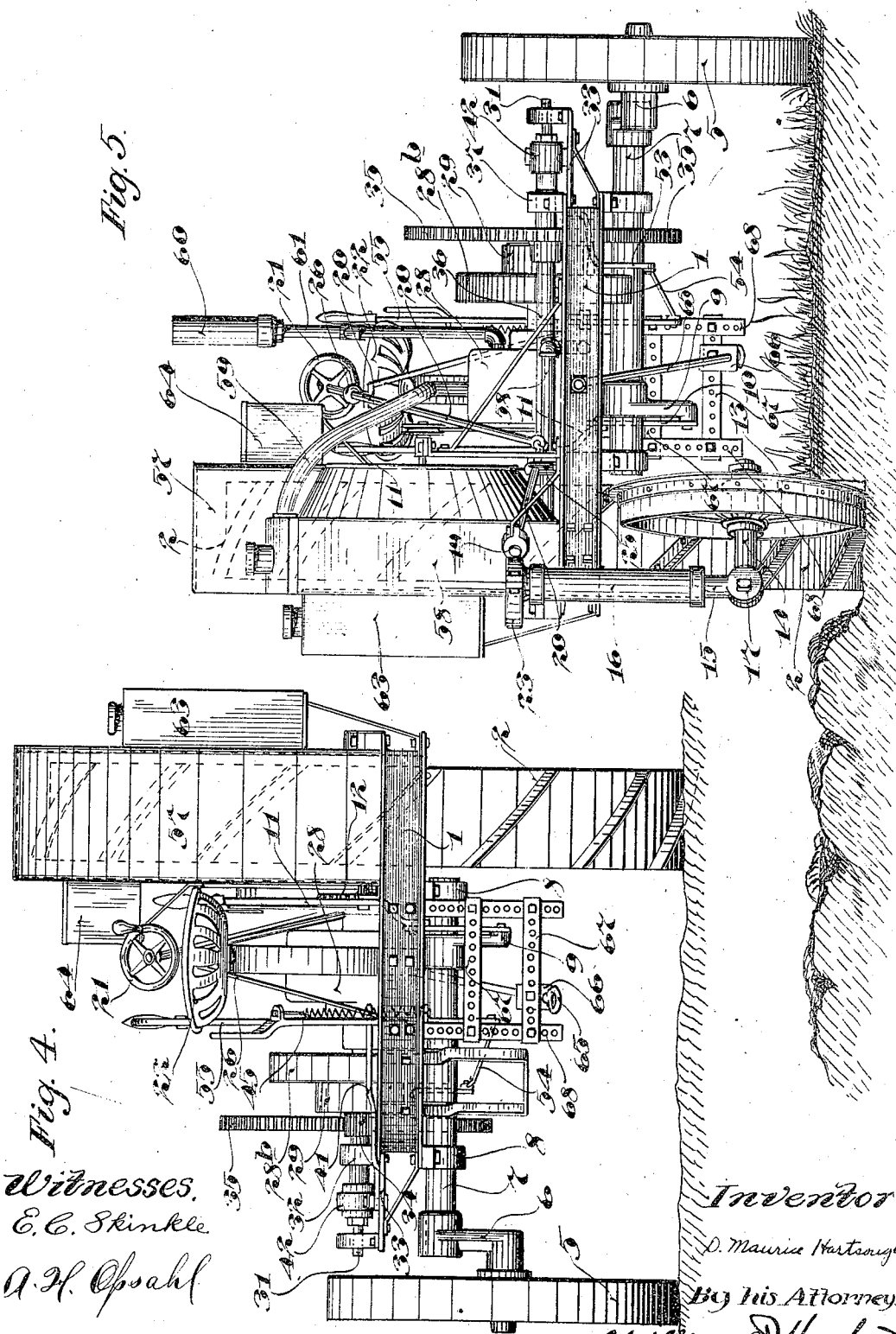

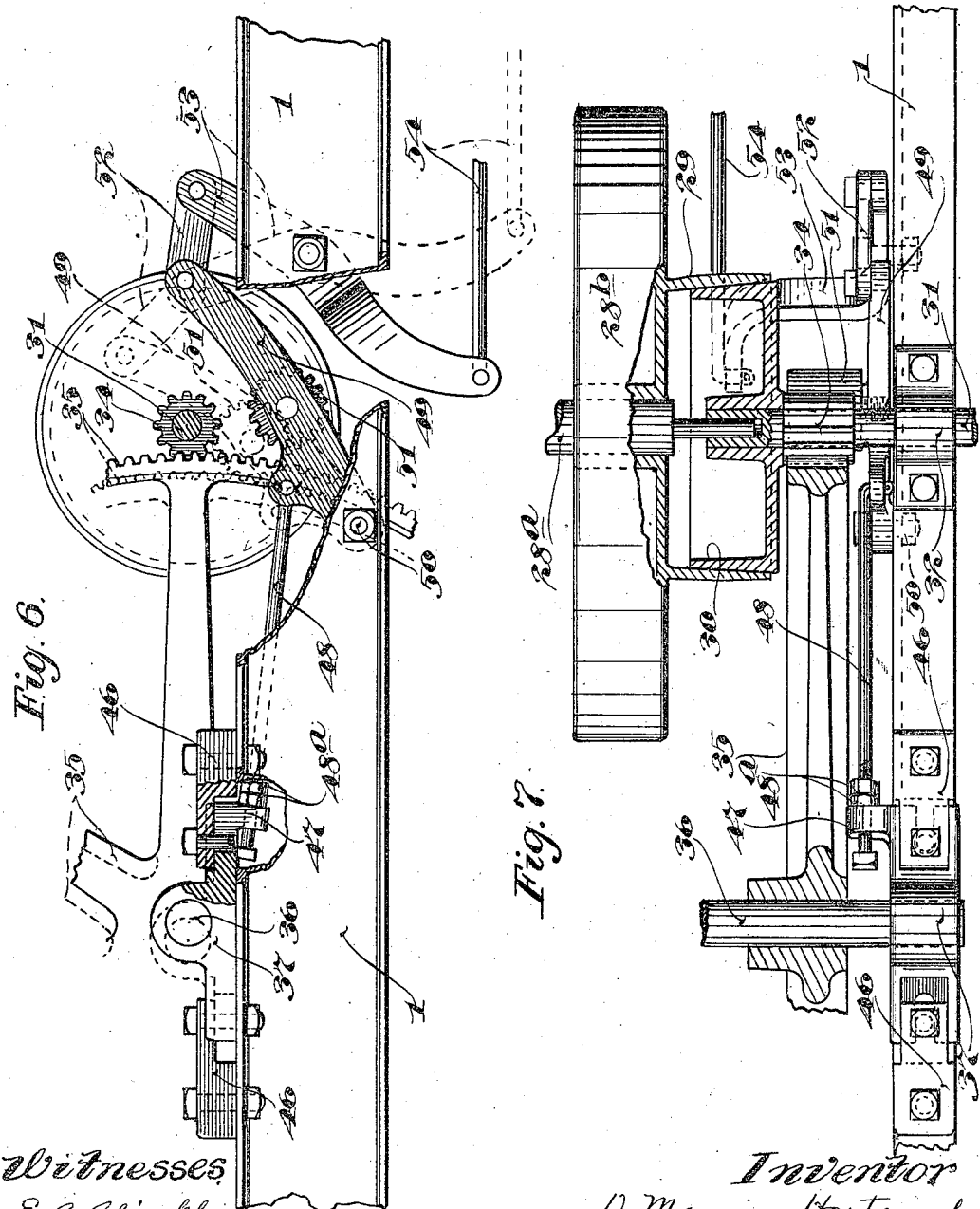

UNITED STATES PATENT OFFICE.

D MAURICE HARTSOUGH, OF MINNEAPOLIS, MINNESOTA, ASSIGNOR TO BULL TRACTOR COMPANY, A CORPORATION OF MINNESOTA.

TRACTOR.

1,128,246.    Specification of Letters Patent.    Patented Feb. 9, 1915.

Application filed September 29, 1913. Serial No. 792,275.

*To all whom it may concern:*

Be it known that I, D MAURICE HARTSOUGH, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

Particularly, my present invention has for its object the provision of a small tractor of extremely simple construction, small cost and high efficiency, and to such ends, generally stated, the invention consists of the novel devices and combinations of devices hereinafter described and defined in the claims.

In the agricultural industry there is a great and constantly increasing demand for tractors or traction engines as a substitute for horses, to draw plows and various other agricultural implements and vehicles. This demand has been met to some extent by very large and very powerful tractors necessarily sold at a high price, and for this reason, put out of the reach of thousands of farmers having small farms and limited means.

While my improved tractor has been designed especially to meet the very great demand for a small and efficient tractor of small cost, found especially on small farms, I have had in mind that even for use on the large or greater farms, a given amount of money invested in properly designed smaller tractors, would result in greater efficiency than when expended on very large powerful and expensive tractors. I have also observed that one serious objection to the use of very heavy tractors in plowing and cultivating, and various other uses, and especially when used on moist or wet ground, is that their wheels leave large and very solidly packed tracks which, when they become dry, are so hard that they cannot be cultivated without breaking and pulverizing, which is an operation not easily accomplished. Moreover, on a good many kinds of soft soil, very heavy tractors cannot be used at all, whereas, a comparatively light tractor would work satisfactorily. Most attempts made to reduce the size and cost of these tractors have been by way of a simple reduction of scale or dimensions thereof, with little or no change in the general principle of construction, and such attempts have failed because simple reduction in size without material reduction in numbers of parts, does not much reduce the cost.

In the preliminaries of working out my improved simplified tractor, I started with the observation that the number of parts in the tractor must be reduced to a minimum. I therefore, determined that the truck of the tractor should have three wheels; that one of these wheels, only, should be used as a traction wheel; that as much as possible of the load should be carried on this one tractor; that a compensating or differential gear mechanism necessarily employed with two traction wheels, could be dispensed with in driving the single traction wheel; that of the three wheels of the truck, one thereof, should be located in front of the other two and used as a steering wheel; and that by placing this single front wheel directly in front of the traction wheel, it could be caused to run in the same furrow with the traction wheel in plowing, and hence, by the proper connections, it could be used not only as a steering wheel in the ordinary sense, but as an automatically acting guide wheel adapted to follow the furrow in plowing, and hence, to automatically guide the tractor by the furrow made on a previous trip of the tractor. Even when the tractor is running on the road or on level ground, or for purposes other than plowing, it is highly important that the front guide wheel be so located that it will run within the path or track of the traction wheel, because, by this arrangement, only two tracks are left, whereas, in three-wheeled trucks, generally, three distinct tracks are made. Obviously, where three tracks are made, it is much more difficult to cause the wheels to avoid an obstruction than when only two tracks are made. In working out these several primary features, I made various other important inventions. For instance, I provided means for raising and lowering the laterally offset rear wheel of the truck, in respect to the traction wheel, so that the tractor will be run in the level or true position, both when traveling on a road or over a field and when the traction wheel and front guide wheel are running in a furrow, while the laterally offset rear wheel is running on a relatively high surface. Other important features will hereinafter appear in the detail description of the tractor illustrated in the drawings.

In the drawings, like characters indicate like parts throughout the several views.

Referring to the drawings: Figure 1 is a left side elevation of the improved tractor; Fig. 2 is a right side elevation of the tractor, some parts being broken away; Fig. 3 is a plan view of the tractor, some parts being sectioned; Fig. 4 is a rear elevation of the tractor; Fig. 5 is a front elevation of the same; Fig. 6 is a fragmentary view showing in detail a portion of the tractor frame and partly illustrating a reversing device in the power transmission mechanism between the engine and traction wheel, the said parts being viewed in a direction from the left toward the right; and Fig. 7 shows the parts illustrated in Fig. 6, partly in plan and partly in horizontal section.

The framework of the tractor truck, indicated as an entirety by the numeral 1, is preferably a skeleton structure made up of channel beams, or other suitable form of commercial rolled steel. The single traction wheel 2 is, as shown, placed at the right hand side of this frame, between longitudinal bars thereof, and its axle 3 is journaled in suitable bearings 4, rigidly secured on the adjacent longitudinal bars of the said frame. The frame 1 preferably extends at the rear of the traction wheel only far enough to afford the desired clearance, but the said frame is extended on its right hand side, to a point considerably ahead of the traction wheel, and its forwardly projecting portion is converged to a point at the extreme right hand side of the said frame, so that the right hand side of the said frame is maintained straight while the left hand side of the frame is formed with a sort of a lateral bulge at its intermediate portion.

An idle laterally offset rear wheel 5 is journaled on the crank end 6 of a crank axle 7 that is journaled in suitable bearings 8, as shown, secured to the underside of the main frame 1. By oscillations of this crank axle 7, the wheel 5 may be raised and lowered in respect to the traction wheel 2; and in order that this oscillation of the said crank axle may be accomplished by means of a lever, it is provided with a depending crank arm 9, located near its inner end. This arm 9 is connected by a link 10 and to the lower end of a latch lever 11 that is pivoted to a suitable bearing on the frame 1 and coöperates with a notched lock segment 12 rigidly secured to said frame 1 in proper position for coöperation with the said latch lever.

The front or guide wheel 13 of the truck, as shown, is journaled to a trunnion or stub axle 14 secured by the lower end of a vertical spindle 15 journaled in a heavy sleeve-like bearing 16 rigidly secured to the converged front end of the frame 1. The guide wheel 13 is thus mounted so that it is free to rotate and may be given its angular or steering movements by oscillation of the spindle 15. Preferably, the trunnion 14 is rigidly but adjustably secured to the lower end of the spindle 15 by interlocked hubs on the said members that are clamped together by a suitable bolt 17. By adjustments of this connection, the guide wheel may be set so that it will incline in the one direction or the other, or may be set in a true vertical position, as found desirable to best adapt it to follow a furrow.

A worm gear 18 is secured to the upper end of the wheel spindle 15 and engages a worm 19 secured on the front end of a jointed or flexible steering rod 20, which, at its rear end, has a suitable hand piece shown as in the form of a wheel 21 located within easy reach of an operator seated on the operator's seat 22. Preferably, the worm gear 18 is inclined in a gear casing 23 that loosely surrounds the same and is anchored against rotation by an anchor strap 24 secured to the frame 1. This gear casing also affords a suitable support and journal for the extreme front end of the steering rod 20. The said steering rod is also journaled in suitable bearings 25 and 26 that rise from the frame 1. As a desirable feature, which, however, constitutes no part of the present invention, the wheel spindle 15 is provided with an upwardly extended reduced portion 15$^a$ to the upper end of which is attached a figure 27, that serves as a pointer to indicate the direction in which the guide wheel 13 is adjusted to travel.

The motor for propelling this vehicle is preferably an explosive engine, and, as shown, this engine is of the two-cylinder horizontally opposed type. The said engine which is indicated as an entirety by the numeral 28, has its cylinder casting rigidly secured on the framework 1 with its crank shaft 28$^a$ extending transversely of the tractor. Also, the said engine is located as closely as practicable to the axis of the traction wheel 2. The engine crank shaft 28$^a$ (see particularly Fig. 7) and also other views, carries a fly wheel 28$^b$ that has a conical clutch flange 29. The clutch flange 29 is adapted to be frictionally engaged, at will, by a conical clutch wheel or member 30 secured to the inner end of a transverse shaft 31 that is axially alined with the engine crank shaft 28$^a$ and is adapted to be coupled to the said engine crank shaft, at will, for rotation therewith. This shaft 31 is journaled in suitable bearings 32 and 33 on the engine frame 1, and is capable of a slight endwise movement, as well as a rotary movement. It carries a small spur pinion 34 that meshes with a larger spur gear 35, which latter is secured to a counter shaft 36, journaled in suitable bearings 37 and 38 on the frame 1. The counter shaft 36, at its inner end, carries a pinion 39 which is preferably in the form of a so-called lantern gear, the pinions of which are equipped with anti-friction rollers. This pinion 39 meshes with a larger internal ring gear 40 that is rigidly secured to the traction wheel 2 for rotation therewith.

Means has now been described whereby the traction wheel may be driven from the engine whenever the clutch elements 29 and 30 are engaged. For moving the shaft 31 endwise to effect the engagement and disengagement of the clutch members, at will, a shipper lever 41 is intermediately pivoted, as shown, to the bearing 33, and at its forwardly extended end, is pivotally connected to a sleeve 42 that is secured for endwise movements with the said shaft 31 but in which the said shaft is free to rotate. The inwardly extended end of this lever 41 is connected by a link 43 to a clutch operated lever 44, pivoted to the rear portion of the frame 1 and within reach from the seat 22. This lever 44 is arranged to be yieldingly held in either of two positions, to-wit, either in a position to hold the clutch members 29 and 30 engaged, or to separate them, by means of a coupled tension spring 45 attached at its upper end to the said lever and anchored at its lower end to the frame 1, (see particularly Figs. 1 and 4).

I also provide a simple and efficient reversing device in the power transmission mechanism, which reversing device is best shown in Figs. 1, 3, 6 and 7. As a feature of this mechanism, the left hand bearing 37, in which, as already noted, the left hand end of the shaft 36 is journaled, is mounted for sliding movements on the frame 1, being free for forward and rearward movements, but securely held in position by means of keeper lugs 46 on the said main frame. This sliding bearing 37 has an inwardly projecting lug 47 through which works the headed end of a thrust rod 48. The said lug 47 has a limited movement between the headed front end of said rod and nuts 48ª adjustably secured on said rod. The rear end of the rod 48 is attached to a gear carrier in the form of a lever 49 that is pivoted to the frame 1 at 50, and carries a loose intermediate reversing gear 51. The free end of the lever 49 is connected by a short link 52 to the upper end of an intermediate lever 53 that is intermediately pivoted to the frame 1. The lower end of this lever 53 is connected by a rod or link 54 to the lower end of a latch lever 55 that is pivoted to the frame 1 and is adapted to be locked in either of two different positions to the lock segment 56 secured on the frame 1. Normally, the lever 55 will be moved farther rearward than shown in Fig. 1 and the lever 49 will be drawn farther downward, so that the head of the rod 48 will hold the gear 35 in mesh with the pinion 34. When the lever 55 is moved forward, it will first move the levers 49 and 53 and reversing gear 51 into the position indicated by full lines in Fig. 6, thereby engaging the nut 48ª with the lug 47, and further forward movement of the said lever will force the bearing 37 forward and thereby first disengage the gear 35 from the pinion 34, and subsequently, engage the reversing gear 51 both with the pinion 34 and the said gear 35. This reversing gear then acts as an intermediate gear to reverse the rotation of the shaft 36, and consequently, of the traction wheel. Under forward movement of the lever 55, the reversing gear 51 is first disengaged from the pinion 34 and the gear 36, and thereafter the said gear 36 is reëngaged with the pinion 34. These movements prevent stripping of teeth of the gears and pinions.

The upper portion of the traction wheel is preferably covered by a sheet metal hood 57.

The numeral 58 indicates a radiator or water cooler carried on the forward portion of the frame 1 and connected to the water jacket of the engine in the usual or any suitable way, through circulating pipes 59.

The numeral 60 indicates an exhaust muffler connected by exhaust pipes 61 to the exhaust ports of the two engines.

The numeral 62 indicates an engine driven fan for forcing a blast of air through the radiator 58.

The numeral 63 indicates an oil tank suitably supported on the truck frame, and as shown, located at the outer side of the hood 57. This tank is connected to the carbureter of the engine in the usual way, by caps not shown.

The numeral 64 indicates a tool box which, as shown, is supported on the inner side of the hood 57.

While it is possible to design this improved tractor in various sizes, still it is especially adapted for use as a small tractor. I have designed and put into use tractors such as illustrated in the drawings, adapted to do the work of five or six horses and to draw two or three plows, and this seems to be the size and power of tractor for which there is the greatest present demand. The wonderful simplicity of the improved tractor built in the size stated, is emphasized by the fact that I have arranged to put such tractors on the market at a retail selling price of approximately three hundred dollars each.

The framework of the tractor may be very cheaply and rigidly constructed from commercial rolled steel. The fewest possible number of truck wheels are employed and two of these are comparatively small, while the other, which is relatively large, is used as the traction wheel. The transmission mechanism between the engine and traction wheel, for forward drive, involves only two shafts, four gears, and a single friction clutch. For a reverse drive of the gear, the intermediate movable gear is added, making, in all, five gears in the whole transmission mechanism. The engine, the operator's seat, the oil tank and radiator are all assembled around and close to the traction wheel, so that the greater part of the weight of the tractor will be carried on the traction wheel where it is desired, in order to give efficient traction without requiring the complete tractor to be very heavy, in proportion to its pulling power. The front guide wheel and offset rear wheel of the tractor carry comparatively small parts of the load, and hence, may be made small and comparatively light.

In running over the road or in the field, the tractor may be very easily controlled by manipulation of the guide wheel 13, which wheel then simply acts as a steering wheel and not as an automatic guide wheel, and hence, is manipulated through the steering rod 20. At such times, as already indicated, the offset side wheel 5 should be lowered, as shown in Figs. 1 and 4, so that the bottoms of the two wheels 2 and 5 are on a level. When the traction wheel 2 and guide wheel 13 are running in a furrow, the side wheel 5 should be adjusted into a relatively high position, as shown in Fig. 5. The guide wheel 13 is preferably made much narrower than the traction wheel 2, and consequently, much narrower than the furrow in which the traction wheel is adapted to run. This guide wheel should be set to hug the land side of the furrow.

The numeral 65 indicates a draw bar which is attached to the front portion of the main frame 1 and inclines rearwardly, and at its rear end is directly supported by a head 66 secured for lateral adjustments on a horizontal perforated bar 67, which, in turn, is secured for vertical adjustments on perforated bars 68, the upper ends of which are rigidly secured to the rear portion of the main frame 1. The rear end of said draw bar 65 is preferably in the form of an I to which connections for drawing plows, or any other implement or vehicle, may be readily attached. By the proper adjustments of the head 66, the draw bar may be so adjusted that it will give exactly the desired draft on the tractor. It is of importance to note that the draw bar is located inward of the large traction wheel, that is between the said traction wheel and the off-set side wheel so that the line of draft strain acting through the truck frame tends to hold the front guide wheel against the vertical wall of the furrow in which the said guide wheel runs.

What I claim is:

1. A tractor having, in combination, a single large rear traction wheel, an idle offset side wheel, capable of being raised and lowered, and a relatively small front guide wheel, the latter being located in front of said traction wheel and being adjustable to vary its angle in respect to the line of travel, and with the parts arranged to throw the greater portion of the weight of the tractor on said single traction wheel, whereby, when the machine is to be used for plowing, the idle wheel may be adjusted to travel on the unplowed ground while the traction wheel and guide wheel travel at a lower level in the same previously formed furrow.

2. A three-wheeled tractor having a large rear traction wheel, an idle offset side wheel capable of being raised and lowered, and a relatively small front guide wheel located in front of said rear traction wheel, with the parts arranged to throw the greater part of the weight of the tractor on the said single traction wheel, whereby when the machine is to be used for plowing the idle wheel may be adjusted to travel upon the unplowed ground while the traction wheel and guide wheel travel at a lower level in the same previously formed furrow and the tractor is automatically guided by the engagement of said guide wheel with the furrow.

3. A three-wheeled tractor having a single large rear traction wheel, an idle offset rear side wheel capable of being raised and lowered, a relatively small front guide wheel located in front of said traction wheel, and a draft connection applied to said tractor and exerting a line of strain that is inward of said traction wheel and guide wheel.

4. A tractor having, in combination, a single traction wheel located at one side of the tractor frame, a pivoted guide wheel located at the forward part of the tractor frame in line with said traction wheel, the lower surfaces of said traction wheel and said guide wheel being arranged at substantially the same level, an idle offset side wheel, means for raising and lowering said idle wheel, and a suitable motor arranged upon the tractor frame and connected with said traction wheel, whereby when the tractor is to be used for plowing, the idle wheel may be set to travel on the unplowed ground while the traction wheel and guide wheel travel at a lower level in the same previously formed furrow.

5. A three-wheeled tractor having a single traction wheel, a pivoted guide wheel arranged in front of said traction wheel and in line therewith, the lower surfaces of said traction wheel and said guide wheel being arranged at substantially the same level, an offset idle side wheel, and means for raising and lowering said side wheel, whereby when the machine is to be used for plowing said idle wheel may be adjusted to travel upon the unplowed ground while the traction wheel and guide wheel travel at a lower level in the same previously formed furrow.

6. A tractor having, in combination, a single large rear traction wheel, an idle offset side wheel capable of being raised and lowered, a relatively small front guide wheel located in front of said traction wheel and being adjustable to vary its angle in respect to the line of travel, and means for locking said guide wheel in the position at which it is set, and with the parts arranged to throw the greater portion of the weight of the tractor on said single traction wheel, whereby, when the machine is to be used for plowing, the idle wheel may be adjusted to travel on the unplowed ground while the traction wheel and guide wheel travel at a lower level in the same previously formed furrow.

In testimony whereof I affix my signature in presence of two witnesses.

D MAURICE HARTSOUGH.

Witnesses:
    BERNICE G. WHEELER,
    HARRY D. KILGORE.